(12) United States Patent
Zeitler et al.

(10) Patent No.: US 7,728,302 B2
(45) Date of Patent: Jun. 1, 2010

(54) SCINTILLATION ELEMENT, SCINTILLATION ARRAY AND METHOD FOR PRODUCING THE SAME

(75) Inventors: Guenter Zeitler, Aachen (DE); Herbert Schreinemacher, Baesweiler (DE); Cornelis Reinder Ronda, Aachen (DE); Norbert Conrads, Raeren (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 150 days.

(21) Appl. No.: 12/159,801

(22) PCT Filed: Jan. 8, 2007

(86) PCT No.: PCT/IB2007/050051
§ 371 (c)(1),
(2), (4) Date: Sep. 9, 2008

(87) PCT Pub. No.: WO2007/080535
PCT Pub. Date: Jul. 19, 2007

(65) Prior Publication Data
US 2009/0173885 A1    Jul. 9, 2009

(30) Foreign Application Priority Data
Jan. 16, 2006   (EP) .................................. 06100373

(51) Int. Cl.
*G01T 1/20* (2006.01)

(52) U.S. Cl. .......................... 250/370.11; 252/301.4 R
(58) Field of Classification Search ............. 250/361 R, 250/362, 367, 368, 370.11, 370.12, 370.13, 250/458.1, 459.1; 252/301.16–301.4 H; 264/1.1, 1.21, 1.24, 1.9, 3.1; 428/690
See application file for complete search history.

(56) References Cited

U.S. PATENT DOCUMENTS

| | | | |
|---|---|---|---|
| 5,169,610 A | 12/1992 | Yamada et al. | |
| 5,208,460 A | 5/1993 | Rougeot et al. | |
| 6,087,663 A * | 7/2000 | Moisan et al. | 250/367 |
| 2002/0192500 A1 | 12/2002 | Yano et al. | |
| 2004/0206735 A1 | 10/2004 | Okuda et al. | |
| 2007/0114426 A1 * | 5/2007 | Tkaczyk | 250/370.09 |
| 2009/0134334 A1 * | 5/2009 | Nelson | 250/361 R |

* cited by examiner

*Primary Examiner*—David P Porta
*Assistant Examiner*—David S Baker

(57) ABSTRACT

A scintillation element comprises a scintillation material, and a reflective layer, wherein the reflective layer is formed as an intrinsic part of the scintillation material. Preferably, a plurality of scintillation elements may be arranged to form a scintillation array. A method for producing a scintillation element comprises providing a scintillation material, and producing a reflective layer at the scintillation material by exposing the scintillation material to physical and/or chemical conditions in such a way that the reflective layer is formed out of a part of the scintillation material.

23 Claims, 1 Drawing Sheet

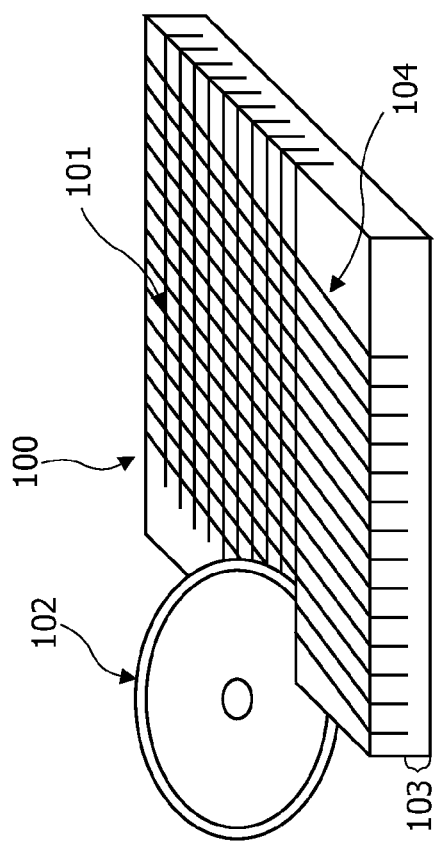
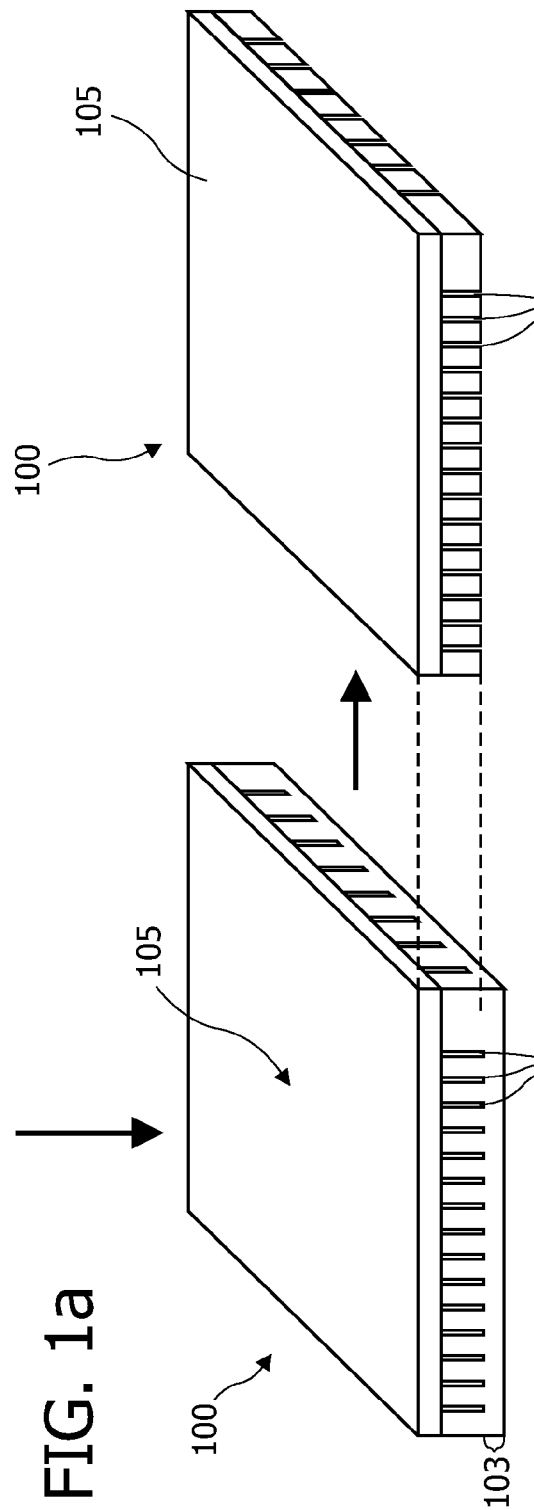
FIG. 1a
FIG. 1b
FIG. 1c

SCINTILLATION ELEMENT, SCINTILLATION ARRAY AND METHOD FOR PRODUCING THE SAME

The invention relates to a scintillation element, a scintillation array, a method for producing a scintillation element and a method for producing a scintillation array, in particular to a scintillation element and a scintillation array usable in the field of computed tomography (CT).

In computed tomography (CT) presently the fluorescent ceramic $Gd_2O_2S$: Pr,Ce (GOS) is used as scintillator material to convert x-ray photons into visible light. GOS has the advantage of having a high light-yield and absorption efficiency but generally suffers from exhibiting afterglow signals after irradiation. This afterglow has a signal contribution, which is so high, and a duration, which is so long that the reconstructed images suffer from severe artefacts. Suitable post-processing of the ceramic wafers, e.g. by annealing in air for a few hours, can reduce this afterglow. In addition to afterglow the issue of light-yield is of prime importance for CT applications. In conventional CT detectors reflective coating materials are used, which cover each CT detector pixel at five sides, thus increasing the amount of light impinging on a light sensitive photodiode, located at the sixth side.

It may be desirable to provide an efficient scintillation element, a scintillation array and a method for producing the same, wherein the scintillation element and the scintillation array may be usable in the field of computed tomography.

This need may be met by the scintillation element, the scintillation array, the method for producing a scintillation element and a method for producing a scintillation array according to the independent claims.

According to an exemplary embodiment a scintillation element comprises a scintillation material, and a reflective layer, wherein the reflective layer is formed as an intrinsic part of the scintillation material. Preferably, a plurality of scintillation elements may be arranged to form a scintillation array.

According to an exemplary embodiment a method for producing a scintillation element comprises providing a scintillation material, and producing a reflective layer at the scintillation material by exposing the scintillation material to physical conditions in such a way that the reflective layer is formed out of a part of the scintillation material.

According to an exemplary embodiment a method for producing a scintillation array comprises providing a raw ceramic wafer comprising a scintillation material, and structuring the raw ceramic wafer by forming trenches into a top surface of the raw ceramic wafer. Furthermore, the method comprises producing a reflective layer at the structured ceramic wafer by exposing the scintillation material of the raw ceramic wafer to physical conditions in such a way that the reflective layer is formed out of a part of the scintillation material.

A basic idea of the invention may be that a highly reflective coating or layer may be produced out of the scintillation material itself. Thus, the step of forming of a reflective layer by painting such a reflective layer onto a scintillation material, which is the way to produce a reflective layer according to the prior art, may be omitted, which may lead to a simpler producing method. Also the durability of the reflective layer according to the present invention may be enhanced, since it is formed out of the scintillation material and is not painted onto the scintillation material as in the prior art. The reflective layer according to the present invention may reflect a significant fraction of light, which otherwise would be lost. This may allow to increase the light-output of each scintillation element without the need of further costly processing steps and additional material costs as necessary in methods according to the prior art. The reflective layer according to the present invention may exhibit reflective properties which are very comparable to conventional coatings while it may be formed by a much more simple process. In other words, the reflective coating according to the present invention may improve the light collection efficiency similar to conventional coatings. At the same time it may be possible that a so-called afterglow of the scintillation material is not increased when a reflective layer according to an embodiment of the invention is produced from the scintillation material itself.

Preferably, the reflective coating layer may be formed on all sides of each individual scintillation element except sides on which photo-detectors, e.g. photodiodes, are coupled, i.e. in case of arranging a single photo-detector to the scintillation element only one side is not coated with the reflective layer, i.e. the scintillation element comprises a reflective layer on five of its six surfaces.

The intrinsic reflective layer may be integrally formed with the scintillation material, i.e. is not painted onto or formed as a separate layer onto the scintillation material but is formed out of a part of the scintillation material itself. Thus, the reflective layer may be formed by physical and/or chemical processes out of the scintillation material itself. The producing of the reflective layer may be done together with an annealing step of the scintillation material, i.e. a production step of the reflective layer and an annealing step is one single step. Such an annealing process may be advantageous anyway in order to reduce the afterglow of a scintillation material.

In the following, further exemplary embodiments of the scintillation element will be described. However, these embodiments apply also for the scintillation array, for the method for producing a scintillation element and for the method for producing a scintillation array.

According to another exemplary embodiment of the scintillation element the scintillation material comprises $Gd_2O_2S$. Preferably, the scintillation material further comprises praseodymium and/or cerium or other rare earth elements like Eu, Tb, Yb, Dy, Sm and/or Ho.

$Gd_2O_2S$ may be a suitable inorganic scintillation material. In particular, the raw $Gd_2O_2S$ powder can be doped with $Ce^{3+}$ to compensate for europium effects and with praseodymium as an ion relevant for the scintillation process. Furthermore, small amounts of e.g. an alkali and/or earth alkali fluoride like lithiumfluoride (LiF) or lithiumgermaniumfluoride ($Li_2GeF_6$) may be used as sintering aid.

According to another exemplary embodiment of the scintillation element the reflective layer is formed by an oxidation process of the scintillation material.

Providing a scintillation element having a reflective layer which is produced by oxidation of a part, e.g. the surface part, of the scintillation material itself, may be an efficient way to provide a reflective layer so that the light-output of the scintillation material is increased.

In the following, further exemplary embodiments of the scintillation array will be described. However, these embodiments apply also for the scintillation element, for the method for producing a scintillation element and for the method for producing a scintillation array.

According to another exemplary embodiment the scintillation array further comprises at least one photo-detector, wherein the at least one photo-detector is coupled to at least one of the plurality of scintillation elements, and wherein the at least one photo-detector is adapted to detect light emitted by the at least one of the plurality of scintillation elements. Preferably, the photo-detector may be a photodiode. In particular, a plurality of photo-detectors may be coupled to the plurality of scintillation elements. For example, to each scintillation element a separate photo-detector or photodiode may be coupled. Preferably, the photo-detectors may be coupled to a side of a scintillation element on which side no reflective layer is formed. By providing a plurality of scintillation elements each single scintillation elements coupled to a photodiode it may be possible to provide a detector array which may be used in the field of computed tomography, i.e. to provide a segmented detector array or a pixelated detector array.

A scintillation array according to the present invention may be in particular suitable for the use in a computed tomography device, e.g. as a detector array of the computed tomography device.

In the following, further exemplary embodiments of the method for producing a scintillation element will be described. However, these embodiments apply also for the scintillation element, for the scintillation array and for the method for producing a scintillation array.

According to another exemplary embodiment of the method according the producing of the reflective layer comprises the oxidizing of a surface part of the scintillation material.

The oxidizing of a surface part of the scintillation material may be an efficient way to form an intrinsic reflective layer. The oxidized layer may be a layer which is suitable as a reflective layer which reflects a comparable amount of light as a conventional white layer which is painted on the surface of the scintillation material or which is applied to the scintillation material as a foil.

According to another exemplary embodiment of the method the producing of the reflecting layer comprises exposing the scintillation material to an atmosphere having an oxygen partial pressure between 10000 hectopascal and 0.001 hectopascal and a raised temperature between 800° C. and 1400° C., in particular the raised temperature may be between 1000° C. and 1300° C. and the oxygen partial pressure may be between 1000 hectopascal and 0.01 hectopascal.

According to yet another exemplary embodiment of the method the producing of the reflecting layer comprises exposing the scintillation material to a carbon dioxide flow, raising the temperature to about 1200° C., and providing an oxygen partial pressure which is about 0.1 hectopascal.

According to still another exemplary embodiment of the method the producing of the reflecting layer comprises exposing the scintillation material to a nitrogen flow moistened at 20° C., raising the temperature to about 1200° C., and providing an oxygen partial pressure which is about 0.01 hectopascal.

According to yet still another exemplary embodiment of the method the producing of the reflecting layer comprises exposing the scintillation material to airflow, raising the temperature to about 1100° C., and providing an oxygen partial pressure which is about 200 hectopascal. An airflow means that ambient air comprising substantially 80% nitrogen and 20% oxygen is used to provide the air flow.

Under all of the above physical and/or chemical conditions it may be possible to form a reflective layer out of a surface layer of the scintillation material. By choosing the duration of the exposing to this physical conditions a thickness of the reflective layer, i.e. the thickness of a layer comprising oxidized scintillation material, may be determined. A duration of four hours may be a suitable time period to form a reflective layer which may exhibit reflective performance which is comparable to a reflective performance exhibited by conventional reflective layers which are painted on the scintillation material.

According to yet another exemplary embodiment of the method further comprising increasing the temperature to the raised temperature in steps of 5° C. per minute. After a reflective layer is formed the temperature can be decreased, for example at a rate of 5° C. per minute.

In the following, further exemplary embodiments of the method for producing a scintillation array will be described. However, these embodiments apply also for the scintillation element, for the scintillation array and for the method for producing a scintillation element.

According to yet another exemplary embodiment of the method the providing of the raw ceramic wafer comprises providing $Gd_2O_2S$ powder and exposing the $Gd_2O_2S$ powder to a hot uniaxial pressing process.

The hot uniaxial pressing process is a so-called HUP-process and may be a suitable way to provide a raw ceramic wafer which may be used afterwards to manufacture a scintillation array comprising an intrinsic reflective layer.

According to yet another exemplary embodiment of the method of producing a scintillation array further comprising cutting the raw ceramic wafer into a ceramic wafer having a predetermined thickness and polishing the cut ceramic wafer.

By cutting the raw ceramic wafer it may be possible to provide a ceramic wafer of a suitable thickness which can be afterwards polished which may allow for an efficient oxidation process and for the formation of a reflective layer having a suitable reflective coefficient, i.e. which reflects a sufficient amount of light so that the scintillation array may be used in a computed tomography device, for example. A suitable thickness may be for example about 2 mm or less.

According to still another exemplary embodiment of the method of producing a scintillation array the forming of the trenches is performed in such a way that the trenches having a depth smaller than the thickness of the cut ceramic wafer.

By cutting trenches having a depth smaller than the thickness of the ceramic wafer it might be possible to provide an efficient method for producing a large array of scintillation elements which can be handled in an easy way for the further processing. The individual scintillation elements are held together by the part of the ceramic wafer which is not structured, i.e. the bottom part into which no trenches are cut.

According to yet still another exemplary embodiment of the method of producing a scintillation array the producing of the reflective layer is done in such a way that the trenches are fully filled with the reflective layer.

By forming the reflective layer in such a way that the trenches are fully filled with the reflective layer an efficient way for keeping together the single scintillation elements, even when a bottom part of the ceramic wafer may be removed after the formation of the reflective layer.

According to yet still another exemplary embodiment the method further comprises removing a layer of the structured ceramic wafer from a bottom side of the ceramic wafer after the producing of the reflective layer. Preferably, the layer which is removed from the structured ceramic wafer has a thickness which is greater than the thickness of the part of the ceramic wafer into which no trenches is cut, i.e. by removing this layer, bottom parts of the filled trenches are exposed, leading to scintillation elements which are separated wholly of each other by the reflective layer formed in the trenches. This may be an efficient way to produce a scintillation array in which all scintillation elements are optically insulated of each other.

According to yet still another exemplary embodiment the method further comprises polishing the bottom side of the structured ceramic wafer, and arranging at least one photo-detector at the polished bottom side, the photo-detector can be a photodiode, for example.

One basic idea may be seen in the fact that an intrinsic reflective layer is formed out of parts of the scintillation material itself instead of painting the reflective layer onto the scintillation material, or by applying a reflective foil, as it is commonly done in the prior art. The reflective layer may be formed by oxidizing a surface part or surface layer of the scintillation material. This oxidizing, i.e. the forming of the reflective layer, may be done in a single process step together with an annealing process, which may be advantageous anyway to reduce afterglow of the scintillation material. The combination of the annealing step and the oxidation step may be achievable by choosing physical condition, e.g. temperature, atmosphere and/or pressure, accordingly. A reflective layer according to an embodiment of the invention may improve the light collection efficiency similar to conventional coating known in the prior art. Using a method for producing a scintillation array according to an embodiment of the present invention may provide for a simple and inexpensive gluing and mounting procedure to form a scintillator-photo-detector-sandwich structure, i.e. to a structure comprising a layered scintillation array and a layer of at least one or a plurality of photo-detectors glued or mounted to this scintillation array. Each single scintillation element in connection with a single photo-detector may form a pixel of a detector array. A scintillation array according to an embodiment of the invention may be used in a computed tomography device with GOS scintillation detectors, in a computed tomography detector with integrated in-pixel electronics, and/or in a computer tomography detector with a photodiode array.

Preferably, each scintillation element has a cubical form or the form of a cuboid and has a reflective layer at five sides while on the side which has no reflective layer a photo-detector, e.g. a photodiode, is arranged. The scintillation material is preferably $Gd_2O_2S$ (GOS) including small amounts of praseodymium, cerium, other rare earth elements (e.g. Eu, Tb, Yb, Dy, Sm and/or Ho) and/or residues of the fluxing agent e.g. lithiumfluoride. Each scintillation element may form an individual CT-detector pixel which is enclosed by a reflective layer having a high reflection coefficient to increase the light-output. The reflective or coating layer may comprise or consists of gadolinium oxy sulphate ($Gd_2O_2SO_4$) and/or gadolinium oxy sulphite ($Gd_2O_2SO_3$) and/or gadolinium oxide ($Gd_2O_3$) and may be produced in an oxidizing atmosphere at higher temperatures, which may be used for annealing anyway, directly from the GOS ceramic material itself. Such a layer formed in the described manner may be a white layer exhibiting reflective properties which may be very much comparable to conventional coatings and may be formed in a new and simple process, e.g. in a controlled manner directly during an annealing process step, by setting the physical conditions to predetermined values.

These and other aspects of the present invention will become apparent from and elucidated with reference to the embodiment described hereinafter.

Exemplary embodiments of the present invention will be described in the following, with reference to the following drawings.

FIG. 1a to 1c show a simplified schematic process of producing a scintillation array according to an exemplary embodiment of the invention.

The illustration in the drawings is schematically. In different drawings, similar or identical elements are provided with the same reference signs.

FIG. 1 schematically shows a process of producing a scintillation array in particular a structured and coated $Gd_2O_2S$ (GOS) scintillation array. As a starting material GOS powder is used which is most preferably doped with praseodymium (Pr) and cerium (Ce). Further a small amount of lithiumfluoride (LiF), e.g. in a relatively low concentration, is added. Typically, the Pr concentration in the $Gd_2O_2S$ ranges between 100 to 2000 wt. ppm of GOS (most preferably between 500 to 1000 wt. ppm), while the Ce concentration is between 0.1 and 100 wt. ppm based on $Gd_2O_2S$ and is chosen according to the Eu content of the GOS, which is most preferably well below 1 wt. ppm based on $Gd_2O_2S$. The fluxing agent LiF has a concentration between 0.001 to 1 wt. % based on $Gd_2O_2S$ (most preferred is 0.02 wt. %). While the cerium is added as $Ce^{3+}$ in order to compensate for europium effects and the Pr is added as an ion relevant for the scintillation processes, LiF is added as a sintering aid for the following hot uniaxial pressing (HUP) process with which the doped GOS powder is sintered to a raw ceramic wafer. The HUP-process is performed under typical conditions like an uniaxial pressure of 150 MPa, a temperature of 1250° C. while a vacuum around $10^{-4}$ hPa is applied during the hot uniaxial pressing. The resulting raw ceramic wafer comprising $Gd_2O_2S$:Pr;Ce fluorescent material is almost transparent and exhibit a yellow colour due to the content of cerium and an minimized defect structure, e.g. due to oxygen vacancies.

Then the resulting raw ceramic wafer is grinded and cut to a ceramic wafer having a thickness required for the desired application. A possible thickness is around 2 mm, for example, depending on the needs of the application. After the cutting and grinding the ceramic wafer is polished, preferably. This polishing is only performed at that side which is afterwards covered by a reflective layer, i.e. on the side which is depicted as the top surface in FIG. 1. This polishing is performed to achieve a higher reflective coefficient of the scintillator on that side and furthermore to facilitate a controlled oxidation of that surface.

The polished ceramic wafer is then diced and pixelated by slits formed by a sawing step. However the polished ceramic wafer is not cut fully through the bottom side but a uncut layer of the polished wafer is retained to keep the wafer still intrinsically stable, i.e. stable without external stabilization, so that it is easy to handle in further processing steps. This dicing or pixelstructuring step is schematically shown in FIG. 1a in which the ceramic wafer 100 comprises a number of slits or trenches 101, which are formed by a saw, which is schematically shown as a circular saw 102. Further, it can be seen in FIG. 1a that the ceramic wafer is not cut into pieces but has a layer 103 which connects the single diced elements. Furthermore, the top surface of the ceramic wafer which is polished is labelled in FIG. 1a with the reference sign 104.

FIG. 1b schematically shows the ceramic wafer of FIG. 1a after an annealing step which is performed in an oxidizing atmosphere, which produces a white layer 105 on all sides of the ceramic wafer 100, only the coating at the top-side is shown in FIG. 1b. The slits or trenches 101, forming gaps between the individual elements or pixels, are filled with the reflective layer 105 as well. Depending on the gap size and the annealing condition, i.e. the physical conditions in the annealing/oxidation step, the gaps may be only filled partly. By setting the physical condition in the annealing/oxidation step, i.e. annealing temperature, annealing time and oxygen partial pressure in the oxidizing atmosphere accordingly, coating layers having different thicknesses and reflective quality can be formed.

Coating can be produced which completely fills the slits 101 and thus "gluing" the individual pixels together. Since the individual pixels are fixed together by the coating layer 105 the connection layer or bottom surface layer 103 can be removed, which has been used as a stabilising layer or substrate in the previous steps, without loosing the stability of, i.e. the connection between, the pixel matrix. Alternatively, it is possible to cover the coated top-side of the ceramic wafer with glue to further stabilize the matrix. This may be advantageous in case that the coating layer is not thick enough for a proper stabilization of the matrix. The glue may be removed afterwards when the matrix is stabilized by additional measures. After this fixation, by using glue on the top-side, the bottom layer 103 can also be removed.

In both alternatives the bottom-side, i.e. the side which is depicted at the lower end of the wafer in FIG. 1c, of the ceramic wafer is then polished. Then a photo-detector, e.g. a photodiode, is mounted on the bottom-side of the scintillation array or GOS scintillator layer. Thus, a segmented single scintillation detector is formed. Alternatively, depending on the size of the single pixels, a separate photo-detector can be mounted onto each single pixel, therefore forming a detector array comprising a plurality of scintillation detectors.

As already mentioned above the annealing conditions can be adjusted to achieve a desired coating by setting the physical conditions, i.e. temperature, time and oxygen partial pressure, to appropriate values. Thus, a desired thickness and intrinsic density of the surface oxidation can be obtained, which directly influence its quality as a reflection layer. Simultaneously, during the annealing process after treatment oxygen vacancies in the ceramic wafer are eliminated, which elimination leads to an improved afterglow behaviour of the scintillation wafer. Such after treatment oxygen vacancies are inevitably generated in the HUP-process.

Exemplary annealing conditions which may be used in a method according to the present invention are the following:

4 hours at a temperature of 1200° C. in a carbon dioxide flow and at an oxygen partial pressure of about 0.1 hPa;

4 hours at a temperature of 1200° C. in a nitrogen flow, which was moistened at a temperature of 20° C. and at an oxygen partial pressure of about 0.01 hPa;

4 hours at a temperature of 1100° C. in an air flow and a oxygen partial pressure of about 200 hPa, wherein air flow is a flow of a gas having the composition of ambient air, i.e. substantially about 80% of nitrogen and 20% of oxygen.

The annealing process is carried out in a tube furnace having a corundum tube, wherein the GOS wafer is placed on corundum carriers. A heating ramp and a cooling ramp of 5° C. per minute is applied to the tube furnace.

In the following experimental results are presented. The test measurements were performed in order to determine the afterglow, the light-output and the reflective coating properties, which are key figures for scintillation detectors and which should be optimized. The tests were performed on wafers having sizes of 4 mm by 4 mm. As an example results for two pieces of a single wafer produced in one HUP-process are shown. Afterglow and light-output have been measured according to the following procedure:

A Hamamatsu photomultiplier tube and a National Instruments Analog/Digital Converter were used, wherein a lead shield was used to shield the photomultiplier against direct irradiation. The afterglow was measured with 120 kV/100 mA, a Focus-to-Detector-Distance of 80 cm and using a x-ray pulse of 2 seconds duration having an absorbed dose (energy flow) of 18 to 20 milligray per second. The afterglow was measured directly after the x-ray pulse has been switched off. The afterglow given in the table below are given in parts per million (ppm) of the stationary signal 500 ms after the x-ray pulse has been switched off. The signal values, i.e. the light-output, were measured on 4 mm×4 mm pixels which were glued to a photodiode (Hamamatsu) by using silicone. For the light-output measurement we used an x-ray pulse at 120 kV/20 mA, Focus-to-Detector-Distance of 80 cm with an exposure time of 5 s duration. The x-ray exposure causes a photocurrent (signal value) which we measured with a Keithley Electrometer under stationary conditions at the end of the 5 s exposure time.

TABLE 1

| Sample | Composition of the initial raw material | Annealing condition | Coating condition | Afterglow at 500 ms [ppm] | Light-output [rel. units] |
|---|---|---|---|---|---|
| HUP-17 Piece (3) | $Gd_2O_2S$: Pr; Ce | Annealing: 4 h at 1200° C. with $CO_2$ | External reflective coating | 7 ± 1 | 78 ± 1 |
| | | | Intrinsic reflective coating | 5 ± 1 | 72 ± 1 |
| | | | No reflective coating | 5 ± 1 | 61 ± 1 |

TABLE 2

| Sample | Composition of the initial raw material | Annealing condition | Coating condition | Afterglow at 500 ms [ppm] | Light-output [rel. units] |
|---|---|---|---|---|---|
| HUP-17 Piece (7) | $Gd_2O_2S$: Pr; Ce | Annealing: 4 h at 1200° C. with $N_2$ 5.0 (purity grade of 99.999 vol %), mosit at 20° C. | External reflective coating | 5 ± 1 | 75 ± 1 |
| | | | Intrinsic reflective coating | 5 ± 1 | 73 ± 1 |
| | | | No reflective coating | 5 ± 1 | 58 ± 1 |

The results shown in the tables indicates within the experimental errors that there are no significant differences between the intrinsic coating layer produced according to an embodiment of the present invention and an external reflector which is produced according to the prior art. In general, a reflective coating leads to an increase in light-output in the order of about 20% compared to the case in which no reflective coating is used. In addition this results prove that it is possible to produce ceramics, i.e. scintillation elements, having an afterglow which is well below 20 ppm after 0.5 s which is a fundamental prerequisite to ensure that the scintillation elements can be used as detectors in computed tomography devices without introducing afterglow artefacts into the CT images.

According to an aspect of the present invention an efficient scintillation element, a scintillation array and an easy and non complex method for producing the same may be provided by forming a reflective layer of the scintillation elements by oxidizing the material of the scintillation elements itself. The scintillation element and the scintillation array may be usable in the field of computed tomography.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

The invention claimed is:

1. A scintillation element comprising:
a scintillation material; and
a reflective layer,
wherein the reflective layer is formed as an intrinsic part of the scintillation material.

2. The scintillation element according claim 1,
wherein the scintillation material comprises $Gd_2O_2S$.

3. The scintillation element according claim 2,
wherein the scintillation material further comprises Praseodymium and/or Cerium and/or other rare earth elements including Eu, Tb, Yb, Dy, Sm, Ho.

4. The scintillation element according claims 1,
wherein the reflective layer is formed by an oxidation process of the scintillation material.

5. A scintillation array comprising:
a plurality of scintillation elements according to claims 1.

6. The scintillation array according claim 5, further comprising:
at least one photo-detector,
wherein the at least one photo-detector is coupled to at least one of the plurality of scintillation elements; and
wherein the at least one photo-detector is adapted to detect light emitted by the at least one of the plurality of scintillation elements.

7. A method for producing a scintillation element, the method comprising:
providing a scintillation material; and
producing a reflective layer at the scintillation material by exposing the scintillation material to physical and/or chemical conditions in such a way that the reflective layer is formed out of a part of the scintillation material.

8. The method according to claim 7,
wherein the producing of the reflective layer comprises:
oxidizing a surface part of the scintillation material.

9. The method according claim 8,
wherein the producing of the reflective layer comprises:
exposing the scintillation material to an atmosphere having an oxygen partial pressure between 10000 hectopascal and 0.001 hectopascal and a raised temperature between 800° C. and 1400° C.

10. The method according claim 9,
wherein the raised temperature is between 1000° C. and 1300° C.; and
wherein the oxygen partial pressure is between 1000 hectopascal and 0.01 hectopascal.

11. The method according claim 10,
wherein the producing of the reflecting layer comprises:
exposing the scintillation material to a carbon dioxide flow;
raising the temperature to about 1200° C.; and
providing an oxygen partial pressure which is about 0.1 hectopascal.

12. The method according claim 10,
wherein the producing of the reflecting layer comprises:
exposing the scintillation material to a nitrogen flow moistened at 20° C.;
raising the temperature to about 1200° C.; and
providing an oxygen partial pressure which is about 0.01 hectopascal.

13. The method according claim 10,
wherein the producing of the reflecting layer comprises:
exposing the scintillation material to an air flow;
raising the temperature to about 1100° C.; and
providing an oxygen partial pressure which is about 200 hectopascal.

14. The method according claim 9, further comprising:
increasing the temperature to the raised temperature in steps of 5° C. per minute.

15. The method according claim 9, further comprising:
decreasing the temperature after the producing of the reflective layer.

16. The method according claim 15,
wherein the decreasing of the temperature is done in steps of 5° C. per minute.

17. A method for producing a scintillation array, the method comprising:
providing a raw ceramic wafer comprising a scintillation material;
structuring the raw ceramic wafer by forming trenches into a top surface of the raw ceramic wafer; and
producing a reflective layer onto the structured ceramic wafer by exposing the scintillation material of the structured ceramic wafer to physical conditions in such a way that the reflective layer is formed out of a part of the scintillation material.

18. The method according claim 17,
wherein the producing of the raw ceramic wafer comprises:
providing $Gd_2O_2S$ powder; and
exposing the $Gd_2O_2S$ powder to a hot uniaxial pressing process.

19. The method according claim 17, further comprising:
cutting the raw ceramic wafer into a ceramic wafer having a predetermined thickness; and
polishing the cut ceramic wafer.

20. The method according claim 19,
wherein the forming of the trenches is performed in such a way that the trenches have a depth smaller than the thickness of the cut ceramic wafer.

21. The method according to claim 17,
wherein the producing of the reflective layer is done in such a way that the trenches are fully filled with the reflective layer.

22. The method according to claim 17, further comprising:
removing a layer of the structured ceramic wafer from a bottom side of the raw ceramic wafer after the producing of the reflective layer.

23. The method according claim 22, further comprising:
polishing the bottom side of the structured ceramic wafer; and
arranging at least one photodiode onto the polished bottom side.

* * * * *